United States Patent
Mizogami et al.

(10) Patent No.: US 12,104,303 B2
(45) Date of Patent: Oct. 1, 2024

(54) SPUNBOND NONWOVEN FABRIC FOR USE IN FILTERS, AND MANUFACTURING METHOD THEREOF

(71) Applicant: Toray Industries, Inc., Tokyo (JP)

(72) Inventors: Shinobu Mizogami, Otsu (JP); Hiroyuki Matsuura, Otsu (JP); Ryoichi Hane, Otsu (JP)

(73) Assignee: Toray Industries, Inc., Tokyo (JP)

( * ) Notice: Subject to any disclaimer, the term of this patent is extended or adjusted under 35 U.S.C. 154(b) by 679 days.

(21) Appl. No.: 17/252,345

(22) PCT Filed: Jun. 11, 2019

(86) PCT No.: PCT/JP2019/023072
§ 371 (c)(1),
(2) Date: Dec. 15, 2020

(87) PCT Pub. No.: WO2020/004007
PCT Pub. Date: Jan. 2, 2020

(65) Prior Publication Data
US 2021/0262133 A1 Aug. 26, 2021

(30) Foreign Application Priority Data
Jun. 25, 2018 (JP) ................. 2018-119649

(51) Int. Cl.
*D04H 3/16* (2006.01)
*D04H 3/011* (2012.01)
*D04H 3/147* (2012.01)

(52) U.S. Cl.
CPC ............ *D04H 3/16* (2013.01); *D04H 3/011* (2013.01); *D04H 3/147* (2013.01); *D10B 2321/02* (2013.01); *D10B 2401/062* (2013.01); *D10B 2403/0211* (2013.01); *D10B 2505/04* (2013.01); *Y10T 442/681* (2015.04)

(58) Field of Classification Search
CPC .......... D04H 3/16; D04H 3/011; D04H 3/147; D10B 2321/02; D10B 2401/062; D10B 2403/0211; D10B 2505/04; Y10T 442/681; B01D 2239/0654; B01D 39/1692; B01D 2239/0233; B01D 2239/025; B01D 2239/0627; B01D 2239/1233; B01D 39/163
See application file for complete search history.

(56) References Cited

U.S. PATENT DOCUMENTS

| | | | | |
|---|---|---|---|---|
| 5,397,632 A | * | 3/1995 | Murphy, Jr. | ......... B32B 27/12 442/388 |
| 6,497,950 B1 | * | 12/2002 | Haile | .............. D01F 8/14 528/307 |
| 7,033,497 B1 | | 4/2006 | Yamaguchi et al. | |
| 7,641,764 B2 | | 1/2010 | Yoshida et al. | |
| 2009/0288558 A1 | * | 11/2009 | Duello | ............... B01D 39/163 96/27 |
| 2009/0324895 A1 | | 12/2009 | Takano et al. | |
| 2013/0111861 A1 | | 5/2013 | Sakamoto | |
| 2015/0351976 A1 | | 12/2015 | Viens et al. | |
| 2017/0216750 A1 | | 8/2017 | Kobori et al. | |
| 2018/0245253 A1 | | 8/2018 | Shimada et al. | |
| 2018/0369737 A1 | | 12/2018 | Shimada et al. | |
| 2020/0139282 A1 | | 5/2020 | Mizogami et al. | |

FOREIGN PATENT DOCUMENTS

| | | |
|---|---|---|
| CN | 103933785 A | 7/2014 |
| CN | 107923095 A | 4/2018 |
| EP | 1980308 A1 | 10/2008 |
| EP | 3395426 A1 | 10/2018 |
| JP | 2000218113 A | 8/2000 |
| JP | 2001062217 A | 3/2001 |
| JP | 2005007268 A | 1/2005 |
| JP | 2007231500 A | 9/2007 |
| JP | 2010121241 A | 6/2010 |
| JP | 2010129486 A | 6/2010 |
| JP | 2012017529 A | 1/2012 |
| WO | 2017110365 A1 | 6/2017 |
| WO | 2018079635 A1 | 5/2018 |
| WO | 2018221122 A1 | 12/2018 |

OTHER PUBLICATIONS

Indian Hearing Notice for Indian Application No. 202047054936, dated Nov. 9, 2021 with translation, 4 pages.
Chinese Office Action for Chinese Application No. 201980039396. 1, dated Sep. 18, 2021 with translation, 12 pages.
International Search Report and Written Opinion for International Application No. PCT/JP2019/023072, dated Jul. 9, 2019, 4 pages.
European Communication pursuant to Article 94(3) for European Application No. 19824697.7, dated Mar. 7, 2023, 4 pages.
Indian Examination Report for Indian Application No. 202047054936, dated Mar. 29, 2021 with translation, 7 pages.
Office Action (Communication pursuant to Article 94(3) EPC) issued Mar. 6, 2024, by the European Patent Office in corresponding European Patent Application No. 19 824 697.7-1102. (4 pages).
Sheng et al., "Novel Technology of Nonwovens", Beijing China Textile Press, 1998 with translation, 10 pages.
Extended European Search Report for European Application No. 19824697.7, dated Mar. 18, 2022, 8 pages.
Chinese Office Action for Chinese Application No. 201980039396.1 with translation, dated Apr. 1, 2022, 12 pages.

* cited by examiner

*Primary Examiner* — Elizabeth M Imani
(74) *Attorney, Agent, or Firm* — Buchanan Ingersoll & Rooney PC

(57) ABSTRACT

Provided is a spunbond nonwoven fabric for use in filters which has excellent rigidity, folding endurance, and uniformity of a weight per unit area, and which also has excellent dust collection performance and mechanical properties. The spunbond nonwoven fabric for use in filters includes a thermoplastic continuous filament and has a partially fused portion. The nonwoven fabric has a stiffness of 2 mN or more and 100 mN or less, a weight per unit area-CV value of 5% or less, and a weight per unit area of 150 g/m² or more and 300 g/m² or less.

14 Claims, No Drawings

SPUNBOND NONWOVEN FABRIC FOR USE IN FILTERS, AND MANUFACTURING METHOD THEREOF

CROSS REFERENCE TO RELATED APPLICATIONS

This is the U.S. National Phase application of PCT/JP2019/023072, filed Jun. 11, 2019, which claims priority to Japanese Patent Application No, 2018-119649, filed Jun. 25, 2018, the disclosures of each of these applications being incorporated herein by reference in their entireties for all purposes.

FIELD OF THE INVENTION

The present invention relates to a spunbond nonwoven fabric for use in filters, which has excellent rigidity, folding endurance, uniformity of a weight per unit area, dust collection performance, and mechanical properties and is used as a pleated filter or a pleated filter substrate to be laminated with a filter material such as a polytetrafluoroethylene (PTFE) film or a nanofiber, and a manufacturing method thereof.

BACKGROUND OF THE INVENTION

Conventionally, in work environments generating dust, dust collectors have been used for the purpose of removal and collection of the dust. Filters for the dust collectors are known to be used in pleated configurations. Because of such pleated configurations of the filters, the dust collectors can have remarkably increased filtration areas, and can therefore achieve reduction of pressure drop and a high collection efficiency.

For the filters of the dust collectors, so-called backwashing is commonly employed, wherein compressed air or the like is injected from the inside when the pressure drop reached a certain level, thereby brushing off dust attached to the surface of a filter material. In particular, the pleated filter is in a bent state many times by the pressure of air in pleated peak and valley portions while a process of "dust correction-brushing off dust by backflow air" is repeated, so that the folding endurance of the pleated peak and valley portions is important to extend the life of the filter. Therefore, if the pleated filter does not have sufficient folding endurance as an air filter, the dust leaks from the peak and valley portions, so that a satisfactory filter life cannot be provided.

Various nonwoven fabric substrates have been proposed so far in order to solve such a problem. For example, Patent Documents 1 and 2 disclose a nonwoven fabric in which thermoplastic continuous filaments are integrated by partial thermocompression bonding. Patent Document 3 discloses a filter substrate which is thermocompression-bonded to a spunbond nonwoven fabric having a relatively high weight per unit area by a pair of an engraved roll and a flat metal roll. Furthermore, Patent Document 4 describes a nonwoven fabric for use in filters as a long-fiber nonwoven fabric composed of conjugate fibers made of fibers made of a high-melting point polymer and a low-melting point polymer, wherein the fibers are subjected to partial thermocompression bonding. In the fibers constituting a surface layer part of the nonwoven fabric, the low-melting point polymer is melted or softened to be fused to each other. Meanwhile, Patent Document 5 discloses the following attempt. When the longitudinal direction of a nonwoven fabric is bent into peaks and valleys, and pleated to form a filter unit, fibers constituting the nonwoven fabric are oriented along the longitudinal direction to increase the folding endurance.

PRIOR ART DOCUMENTS

Patent Documents

Patent Document 1: Japanese Patent Laid-open Publication No. 2007-231500
Patent Document 2: Japanese Patent Laid-open Publication No. 2010-121241
Patent Document 3: Japanese Patent Laid-open Publication No. 2012-17529
Patent Document 4: Japanese Patent Laid-open Publication No. 2005-7268
Patent Document 5: Japanese Patent Laid-open Publication No. 2001-62217

SUMMARY OF THE INVENTION

Meanwhile, in recent years, a filter substrate is required to be able to sufficiently collect fine dust having a particle diameter of several μm or less, so that fibers constituting the filter substrate are required to have a lower fineness to provide a lower weight per unit area. However, as the weight per unit area is lower, or the fineness is lower, folding endurance tends to decrease, which makes it difficult to obtain a filter substrate having satisfactory folding endurance.

For example, in the techniques disclosed in Patent Documents 1, 4 and 5, the constituting fibers or nonwoven fabrics are fused by a heat treatment, which makes it difficult to achieve both filter performance and sufficient rigidity. In some cases, when the area ratio of a compression bonded part is high, the compression bonded portion is formed in a film, which is apt to cause cracks to occur, so that the techniques are unsuitable for long-term use. In the technique disclosed in Patent Document 2, the fibers are spread by frictional electrification, so that the technique has a problem that the nonwoven fabric has many voids, which is apt to cause fuzz to occur.

Meanwhile, in the technique disclosed in Patent Document 3, the thermocompression bonding by the engraved roll and the metal roll is disclosed, but the mechanical strength of the thermobonded portion is not sufficient, which causes a problem that peeling is apt to occur in a pleated part.

Therefore, in view of the above problems, an object of the present invention is to provide a spunbond nonwoven fabric for use in filters, which has rigidity, high folding endurance, uniformity of a weight per unit area, and also has excellent dust collection performance and mechanical properties.

Another object of the present invention is to provide a method for efficiently and stably manufacturing a spunbond nonwoven fabric for use in filters, having the above performance.

As a result of diligent studies to achieve the above object, the present inventors have found a method for spreading a thermoplastic continuous filament according to a specific method in a step of forming a fiber web to obtain a substrate for use in filters, and have found that the folding endurance of the substrate for use in filters can be significantly improved. Furthermore, it has been found that the nonwoven fabric makes it possible to achieve both mechanical properties such as rigidity, folding endurance, and uniformity of a weight per unit area and dust collection performance.

The present invention has been completed based on these findings. The present invention provides the following exemplary embodiments.

That is, a spunbond nonwoven fabric for use in filters according to embodiments of the present invention includes a thermoplastic continuous filament and has a partially fused portion. The nonwoven fabric has a stiffness of 2 mN or more and 100 mN or less, a weight per unit area-CV value of 5% or less, and a weight per unit area of 150 g/m² or more and 300 g/m² or less.

According to a preferred aspect of the spunbond nonwoven fabric for use in filters of the present invention, the spunbond nonwoven fabric has folding endurance of 100,000 times or more, as measured according to JIS P8115: 2001 "Paper and board-Determination of folding endurance-MIT method".

According to a preferred aspect of the spunbond nonwoven fabric for use in filters of the present invention, the thermoplastic continuous filament is a composite type filament in which a polyester low melting point polymer having a melting point lower than that of a polyester high melting point polymer is arranged around the polyester high melting point polymer.

According to a preferred aspect of the spunbond nonwoven fabric for use in filters of the present invention, the spunbond nonwoven fabric is fused by partial thermocompression bonding, and has a compression bonded area ratio of 5% or more and 15% or less.

According to a preferred aspect of the spunbond nonwoven fabric for use in filters of the present invention, the spunbond nonwoven fabric has a machine direction stiffness of 10 mN or more and 100 mN or less, and a ratio of the machine direction stiffness to a transverse direction stiffness, of 3 or more.

According to a preferred aspect of the spunbond nonwoven fabric for use in filters of the present invention, the spunbond nonwoven fabric has folding endurance of 150,000 times or more.

According to a preferred aspect of the spunbond nonwoven fabric for use in filters of the present invention, the spunbond nonwoven fabric has a weight per unit area-CV value of 4.5% or less.

According to a preferred aspect of the spunbond nonwoven fabric for use in filters of the present invention, the thermoplastic continuous filament has a single filament diameter of 10.0 μm or more and 22.0 μm or less.

According to a preferred aspect of the spunbond nonwoven fabric for use in filters of the present invention, the spunbond nonwoven fabric is processed into a pleated configuration.

Furthermore, a method for manufacturing a spunbond nonwoven fabric for use in filters according to embodiments of the present invention includes the following steps (a) to (c) to be sequentially performed:
- the step (a) of melt-extruding a thermoplastic polymer from a spinneret, and then towing and stretching the melt-extruded product using an air sucker to obtain thermoplastic continuous filaments;
- the step (b) of regulating alignment of fibers using a fiber spreading plate to deposit the obtained filaments on a moving net conveyor, thereby forming a fiber web; and
- the step (c) of subjecting the obtained fiber web to partial thermocompression bonding.

It is preferable that the method further includes the step of processing the fiber web into a pleated configuration after performing the steps (a) to (c).

According to the present invention, a spunbond nonwoven fabric for use in filters can be obtained, which has an excellent balance between dust collection performance and pressure drop, and excellent mechanical strength, high rigidity, high folding endurance, and uniformity of a weight per unit area. A method for manufacturing a spunbond nonwoven fabric for use in filters of the present invention can efficiently and stably manufacture a spunbond nonwoven fabric for use in filters having the above performance.

DETAILED DESCRIPTION OF EMBODIMENTS OF THE INVENTION

A spunbond nonwoven fabric for use in filters according to embodiments of the present invention is a spunbond nonwoven fabric for use in filters as a long fiber nonwoven fabric including a thermoplastic continuous filament and having a partially fused portion, wherein the nonwoven fabric has a stiffness of 2 mN or more and 100 mN or less, a weight per unit area-CV value of 5% or less, and a weight per unit area of 150 g/m² or more and 300 g/m² or less. The details thereof will be described below.

(Thermoplastic Continuous Filament)

A polyester is particularly preferably used as a thermoplastic resin which is a raw material of the thermoplastic continuous filament constituting the spunbond nonwoven fabric for use in filters according to embodiments of the present invention. The polyester is a high molecular weight polymer obtained by polymerizing an acid component and an alcohol component as monomers. Examples of the acid component which may be used include aromatic dicarboxylic acids such as terephthalic acid, isophthalic acid, and phthalic acid; aliphatic dicarboxylic acids such as adipic acid and sebacic acid; and alicyclic dicarboxylic acids such as cyclohexanecarboxylic acid. Examples of the alcohol component which may be used include ethylene glycol, diethylene glycol, and polyethylene glycol.

Examples of the polyester include polyethylene terephthalate (PET), polybutylene terephthalate (PBT), polytrimethylene terephthalate (PTT), polyethylene naphthalate, polylactic acid, and polybutylene succinate. As the polyester used as a high melting point polymer to be described later, PET, which has a high melting point and excellent heat resistance as well as excellent rigidity, is most preferably used.

As long as the effects of the present invention are not impaired, a nucleating agent, a matting agent, a pigment, a fungicide, an antibacterial agent, a flame retardant, and a hydrophilic agent and the like may be added to the polyester raw materials. In particular, metal oxides such as titanium oxide have effects of reducing the surface friction of fibers to prevent the fusion of the fibers, thereby improving the spinnability, and increasing thermal conductivity in thermocompression bonding molding of a nonwoven fabric using a heat roller to improve the adhesiveness of the nonwoven fabric. Aliphatic bisamides such as ethylene-bis-stearic acid amide, and/or alkyl-substituted aliphatic monoamides have effects of increasing the mold-releasing property between the heat roller and the nonwoven fabric web to improve the conveying performance.

Next, the thermoplastic continuous filament constituting the spunbond nonwoven fabric for use in filters of the present invention is preferably a composite type filament in which a polyester low melting point polymer having a melting point lower than that of a polyester high melting point polymer by 10° C. or higher and 140° C. or lower is arranged around the polyester high melting point polymer.

Thus, when the spunbond nonwoven fabric is formed by thermobonding, and used, the composite type polyester fibers (filaments) constituting the spunbond nonwoven fabric are firmly bonded to each other. Therefore, the spunbond nonwoven fabric for use in filters can have excellent mechanical strength, and can sufficiently withstand repeated backwashing.

The melting point of the polyester low melting point polymer in embodiments of the present invention is lower than that of the polyester high melting point polymer by 10° C. or higher, more preferably 20° C. or higher, and still more preferably 30° C. or higher, whereby appropriate thermobonding properties can be obtained in the spunbond nonwoven fabric for use in filters. Meanwhile, the difference in the melting point between the high melting point polyester and the low melting point polyester is 140° C. or lower, more preferably 120° C. or lower, and still more preferably 100° C. or lower, whereby a decrease in the heat resistance of the spunbond nonwoven fabric for use in filters can be suppressed.

The polyester high melting point polymer in the present invention preferably has a melting point of 200° C. or higher and 320° C. or lower. By setting the melting point of the polyester high melting point polymer to preferably 200° C. or higher, more preferably 210° C. or higher, and still more preferably 220° C. or higher, a filter having excellent heat resistance can be obtained. Meanwhile, by setting the melting point of the polyester high melting point polymer to preferably 320° C. or lower, more preferably 300° C. or lower, and still more preferably 280° C. or lower, a decrease in the productivity due to consumption of a large amount of thermal energy for melting in the manufacture of the nonwoven fabric can be suppressed.

The melting point of the polyester low melting point polymer in the present invention is preferably 160° C. or higher and 250° C. or lower. By setting the melting point of the polyester low melting point polyester to preferably 160° C. or higher, more preferably 170° C. or higher, and still more preferably 180° C. or higher, excellent shape stability is achieved even after passing through a heating process in the manufacture of the pleated filter such as heat setting in the pleating, Meanwhile, by setting the melting point of the polyester low melting point polymer to preferably 250° C. or lower, and more preferably 240° C. or lower, a filter having excellent thermobonding properties during manufacture of the nonwoven fabric and excellent mechanical strength can be obtained.

In embodiments of the present invention, the melting point of the thermoplastic resin is measured under the conditions of a heating rate of 20° C./min and a measurement temperature range of 30° C. to 300° C. using a differential scanning calorimeter (for example, "DSC-2" type manufactured by Perkin-Elmer Corp.), and a temperature exhibiting an extreme value in the obtained melting endothermic curve is taken as the melting point of the thermoplastic resin. A resin exhibiting no extreme value in the melting endothermic curve obtained by the differential scanning calorimeter is heated on a hot plate, and a temperature at which the resin was melted under microscopic observation is taken as the melting point.

When the thermoplastic resin is the polyester, examples of the combination of a pair of the polyester high melting point polymer and the polyester low melting point polymer (hereinafter, may be described in the order of polyester high melting point polymer/polyester low melting point polymer) include the combinations of PET/PBT, PET/PTT, PET/polylactic acid, and PET/copolymerized PET. Among these, the combination of PET/copolymerized PET is preferably used since it has excellent spinnability. As the copolymerization component in the copolymerized PET, isophthalic acid-copolymerized PET is preferably used since it has particularly excellent spinnability.

Examples of the composite form of the composite type filament include a concentric core-sheath type, an eccentric core-sheath type, and a sea-island type. Among these, as the composite form, the concentric core-sheath type is preferable since the filaments can be uniformly and firmly bonded. Furthermore, examples of the cross-sectional shape of the composite type filament include shapes such as a circular cross section, a flat cross section, a polygonal cross section, a multi-lobed cross section, and a hollow cross section. Among these, in a preferred aspect, the cross-sectional shape of the filament to be used is a circular cross-sectional shape.

In the meantime, in the form of the composite type filament, for example, there is also a method in which a fiber made of a polyester high melting point polymer and a fiber made of a polyester low melting point polymer are prepared into a mixed fiber, but the mixed-fiber method causes difficult uniform thermobonding. For example, thermobonding is weak in portions where the fibers made of the polyester high melting point polymer are densely present so that the mechanical strength and the rigidity are poor, which is not suitable as a pleated filter. Meanwhile, there is also a method in which a low melting point polymer is applied to the fiber made of the polyester high melting point polymer by immersion or spraying or the like, but the method makes it difficult to provide uniform application to the surface layer or in the thickness direction so that the mechanical strength and the rigidity are poor, which is not preferred as a pleated filter.

The content ratio between the polyester high melting point polymer and the polyester low melting point polymer is preferably within a range of 90:10 to 60:40, and more preferably within a range of 85:15 to 70:30 in terms of the mass ratio. When the polyester high melting point polymer is contained at 60% by mass or more and 90% by mass or less, the spunbond nonwoven fabric for use in filters can have excellent rigidity and heat resistance. Meanwhile, when the polyester low melting point polymer is contained at 10% by mass or more and 40% by mass or less, the composite type filaments constituting the spunbond nonwoven fabric can be firmly bonded to each other in the process of forming and using the spunbond nonwoven fabric for use in filters by thermobonding so that the spunbond nonwoven fabric can have excellent mechanical strength and sufficiently withstand repeated backwashing.

(Spunbond Nonwoven Fabric for Use in Filters and Method for Manufacturing Spunbond Nonwoven Fabric for Use in Filters)

Next, a spunbond nonwoven fabric for use in filters of the present invention and a manufacturing method thereof will be described. The spunbond nonwoven fabric for use in filters according to embodiments of the present invention is manufactured by sequentially performing the following steps (a) to (c).

the step (a) of melt-extruding a thermoplastic polymer from a spinneret, and then towing and stretching the melt-extruded product using an air sucker to obtain thermoplastic continuous filaments;

the step (b) of regulating alignment of fibers using a fiber spreading plate to deposit the obtained filaments on a moving net conveyor, thereby forming a fiber web; and the step (c) of subjecting the obtained fiber web to partial thermobonding.

In the present invention, it is preferable that the steps (a) to (c) are performed, and the fiber web is then processed into a pleated configuration.

These will be described in more detail below.

(1) (a) Step of Forming Thermoplastic Continuous Filament

First, a thermoplastic polymer is melt-extruded from a spinneret. Then, using an air sucker, the melt-extruded product is towed and stretched to obtain a thermoplastic continuous filament. In particular, when a composite type filament in which a polyester low melting point polymer having a melting point lower than that of a polyester high melting point polymer is arranged around the polyester high melting point polymer is used as the thermoplastic continuous filament, as the composite type filament, the polyester high melting point polymer and the polyester low melting point polymer are melted at a melting point or higher and (the melting point +70° C.) or lower, and the polyester low melting point polymer having a melting point lower than that of the polyester high melting point polymer by 10° C. or higher and 140° C. or lower is arranged around the polyester high melting point polymer. The composite type filament is spun from the pore with a spinneret having a spinneret temperature of a melting point or higher and (the melting point +70° C.) or lower. Then, using an air sucker, the melt-extruded product is towed and stretched at a spinning rate of 4000 m/min or more and 6000 m/min or less to spin a thermoplastic continuous filament such as a filament having a circular cross-sectional shape.

The single filament diameter of the thermoplastic continuous filament constituting the spunbond nonwoven fabric for use in filters according to embodiments of the present invention is 10.0 μm or more and 22.0 μm or less. By setting the single filament diameter of the thermoplastic continuous filament to 10.0 μm or more, preferably 12.0 μm or more, and more preferably 13.0 μm or more, the air permeability of the spunbond nonwoven fabric for use in filters can be improved to reduce the pressure drop. It is also possible to reduce the number of fiber break when forming the thermoplastic continuous filament to improve the stability during production. Meanwhile, by setting the single filament diameter of the thermoplastic continuous filament to 22.0 μm or less, preferably 20.0 μm or less, and more preferably 17.0 μm or less, the uniformity of the spunbond nonwoven fabric for use in filters can be improved to provide the nonwoven fabric having a dense surface, which makes it possible to provide improved collection performance such as easier filtration of dust through the surface layer. As a result, the dust can be easily brushed off to increase the life of the filter.

In the present invention, a value obtained by the following method is employed for the single filament diameter (μm) of the spunbond nonwoven fabric for use in filters.

(i) 10 small piece samples are randomly collected from a spunbond nonwoven fabric for use in filters.

(ii) Their images are taken using a scanning electron microscope or the like at magnification of ×500 to ×2000.

(iii) Ten fibers from each sample, that is, a total of 100 fibers, are arbitrarily selected, and the thickness of each fiber is measured. Each fiber is regarded as having a circular cross section, and its thickness is taken as the fiber diameter.

(iv) The arithmetic average value is rounded to one decimal place to calculate the single filament diameter.

(2) (b) Step of Forming Fiber Web

The nonwoven fabric according to embodiments of the present invention is a so-called spunbond nonwoven fabric for use in filters, and alignment of fibers is regulated by using a fiber spreading plate to deposit the spun thermoplastic continuous filaments on a moving net conveyor, thereby forming a fiber web. Specifically, thermoplastic continuous filaments are sucked by an ejector, and the thermoplastic continuous filaments and pressure air (air) are injected to the lower part of the ejector from a fiber spreading plate having a slit shape to regulate alignment of fibers to deposit the thermoplastic continuous filaments on a moving net conveyor, thereby obtaining a fiber web.

Preferably, a method is applied, in which a fiber web collected by a spunbond method is heat-treated with a pair of engraved embossing rolls.

Even when the composite type polyester fiber is used, it is important that the spunbond nonwoven fabric for use in filters is made of the filament (long fiber). This can provide increased rigidity and mechanical strength as compared with the case of a nonwoven fabric made of short fibers composed of discontinuous fibers, which can be preferably used as a pleated filter.

In the method for manufacturing a spunbond nonwoven fabric for use in filters of the present invention, the fiber web collected on the net conveyor is also preferably temporarily bonded. The temporal bonding is preferably carried out by using a method in which the collected fiber web is thermocompression-bonded using a pair of flat rolls, or a method in which a flat roll is arranged on a net conveyor, and the collected fiber web is thermocompression-bonded between the net conveyor and the flat roll.

The temperature of the thermocompression bonding for temporary bonding is preferably lower than the melting point of the polyester low melting point polymer by 70° C. or higher and 120° C. or lower. Thus, by setting the temperature, the conveying performance can be improved without fibers being excessively bonded to each other.

(3) (c) Step of Partial Thermobonding

Since the spunbond nonwoven fabric for use in filters according to embodiments of the present invention has a partially fused portion, the fiber web obtained in the above step (b) is subjected to partial thermocompression bonding in order to form the partially fused portion. In a preferred aspect, the partially fused portion is subjected to partial thermocompression bonding, but a method of partial thermocompression bonding is not particularly limited. Bonding by a hot embossing roll or bonding by a combination of an ultrasonic oscillating unit and an embossing roll is preferable. In particular, bonding by an embossing roll is the most preferable from the viewpoint of improving the strength of the nonwoven fabric. The temperature of thermobonding by the hot embossing roll is more preferably lower than the melting point of a polymer having the lowest melting point in polymers existing at the fiber surface of the nonwoven fabric by 5° C. or higher and 60° C. or lower, and more preferably 10° C. or higher and 50° C. or lower. A temperature difference between the melting point of a polymer having the lowest melting point in polymers existing at the fiber surface of the nonwoven fabric and the temperature of thermobonding by the hot embossing roll is 5° C. or higher, and more preferably 10° C. or higher, whereby excessive thermobonding can be prevented. Meanwhile, the temperature difference is set to 60° C. or lower, and more preferably 50° C. or lower, whereby uniform thermobonding can be provided in the nonwoven fabric.

A compression bonded area ratio in the partial thermocompression bonding of the spunbond nonwoven fabric for use in filters according to embodiments of the present invention refers to a proportion of an area of a thermocompression bonding part in the whole area of the nonwoven fabric, and this proportion is preferably 5% or more and 15% or less in the whole area of the nonwoven fabric. When the compression bonded area ratio is 5% or more, more preferably 6% or more, and still more preferably 8% or more, the nonwoven fabric having sufficient strength can be obtained. Furthermore, the surface of the nonwoven fabric does not become fuzz-prone. Meanwhile, when the compression bonded area ratio is 15% or less, more preferably 14% or less, and still more preferably 13% or less, it does not occur that voids between fibers become less to cause increased pressure drop, which causes deteriorated collection performance.

The thermocompression bonding part has depression portions, and is formed by fusing thermoplastic continuous filaments constituting the nonwoven fabric to one another by heat and pressure. That is, a portion where thermoplastic continuous filaments fuse together and coagulate as compared with another portions is a thermocompression bonding part. When bonding by a hot embossing roll is employed as a method of thermocompression bonding, a portion where thermoplastic continuous filaments fuse together and coagulate by a projection part of the embossing roll becomes a thermocompression bonding part. For example, when a pair of rolls including an upper roll and a lower roll, of which only one roll has projections and depressions in a predetermined pattern and the other roll is a flat roll not having projections and depressions, are used, the thermocompression bonding part refers to a portion where the thermoplastic continuous filaments of the nonwoven fabric are thermocompression bonded by the projection part of the roll having projections and depressions and the flat roll to coagulate. For example, when an embossing roll including an upper roll and a lower roll, in which a plurality of linear grooves disposed in parallel with one another are formed on the surface of the roll, wherein the groove of the upper roll and the groove of the lower roll are provided so as to cross each other at given angles, is used, the thermocompression bonding part refers to a portion where thermoplastic continuous filaments of the nonwoven fabric are thermocompression bonded by a projection part of the upper roll and a projection part of the lower roll to coagulate. In this case, a portion compression-bonded by the projection part of the upper roll and the recessed part of the lower roll, or by the recessed part of the upper roll and the projection part of the lower roll is not included in the thermocompression bonding part.

The shape of the thermocompression bonding part in the spunbond nonwoven fabric for use in filters of the present invention is not particularly specified. In the case where a pair of rolls including an upper roll and a lower roll, of which only one roll has projections and depressions in a predetermined pattern and the other roll is a flat roll not having projections and depressions, are used, or in the case where in an embossing roll including an upper roll and a lower roll, in which a plurality of linear grooves disposed in parallel with one another are formed on the surface of the roll, wherein the groove of the upper roll and the groove of the lower roll are provided so as to cross each other at given angles, the thermoplastic continuous filaments of the nonwoven fabric are thermocompression bonded by a projection part of the upper roll and a projection part of the lower roll, the shape of the thermocompression bonding part may be a circle, a triangle, a quadrangle, a parallelogram, an ellipse, or a rhombus. Alignment of these thermocompression bonding parts is not particularly specified, and alignment of placing at equal spaces, or alignment of placing at random, or an array in which different shapes are present may be used. Among these, an array, in which the thermocompression bonding parts are placed at equal spaces, is preferable from the viewpoint of the uniformity of the nonwoven fabric. Furthermore, a thermocompression bonding part of a parallelogram formed by using an embossing roll including an upper roll and a lower roll, in which a plurality of linear grooves placed in parallel with one another are formed on the surface of the roll, wherein the groove of the upper roll and the groove of the lower roll are provided so as to cross each other at given angles, and thermocompression bonding with the projection part of the upper roll and the projection part of the lower roll is preferable in that partial thermocompression bonding is performed without peeling off the nonwoven fabric.

Here, the compression bonded area ratio in the present invention is a value obtained as follows.

The area of the thermocompression bonding part per 1 $cm^2$ of the nonwoven fabric is calculated, and rounded to the nearest integer to determine the compression bonded area ratio.

In the present invention, it is preferable to process the fiber web into a pleated configuration after performing the above steps (a) to (c). The pleating can be performed by a usual method.

(4) Spunbond Nonwoven Fabric for Use in Filters

The spunbond nonwoven fabric for use in filters according to embodiments of the present invention has a stiffness of 2 mN or more and 100 mN or less. If the stiffness is 2 mN or more, more preferably 3 mN or more, and still more preferably 5 mN or more, pleating can be performed while the strength and retention property of the nonwoven fabric are maintained. Meanwhile, if the stiffness is 100 mN or less, preferably 80 mN or less, more preferably 60 mN or less, and still more preferably 50 mN or less, the folding endurance during pleating is not large, which provides sharpened finishing of unevenness.

Here, the stiffness in the present invention is a value obtained by the following measurement according to 6.7.4 "Gurley Method (JIS method)" in 6.7 "Stiffness (JIS method and ISO method)" in JIS L 1913:2010 "Test methods for nonwovens".

(i) Test pieces having a length of 38.1 mm (effective sample length L: 25.4 mm) and a width d of 25.4 mm are collected from 5 random locations of a sample. Here, in the present invention, a longitudinal direction of the nonwoven fabric is taken as a machine direction of a sample.

(ii) Each collected test piece is attached to a chuck, and the chuck is fixed in conformity with a scale, 1-1/2 inch (1.5 inch=38.1 mm), on a movable arm A. In this case, an effective sample length L required for measurement is a length obtained by subtracting ½ inch (0.5 inch=12.7 mm) from the test piece length since ¼ inch (0.25 inch=6.35 mm) is required for the chuck and ¼ inch (0.25 inch=6.35 mm) is required for the tip of a pendulum at an open-end of the sample.

(iii) Next, appropriate weights $W_a$, $W_b$ and $W_c$ (g) are attached to engaging holes a, b and c (mm) below a fulcrum of a pendulum B to rotate the movable arm A at a constant speed, and a value (mgf) of a scale RG is read as the test piece leaves the pendulum B. The value of the scale is read to one place of decimals. Here, weights attached to the engaging holes can be appropriately selected, but the value of the scale RG is preferably set to 4 to 6.

(iv) Measurement is performed 5 times per each of a front face and a back face of 5 test pieces, 50 times in total.

(v) The value of the scale RG obtained is rounded to one decimal place using the following formula to determine a stiffness value. The average value of 50 measurements is rounded to one decimal place to calculate the stiffness (mN) of the sample.

$$Br = RG \times (aW_a + bW_b + cW_c) \times \frac{(L-12.7)^2}{d} \times 3.375 \times 10^{-5} \quad \text{[Expression 1]}$$

In the above, a test piece collected so that the longitudinal direction of the sample is the machine direction is used for measurement of a machine direction stiffness, and a test piece collected so that the longitudinal direction of the sample is the transverse direction is used for measurement of a transverse direction stiffness.

In the stiffness in the present invention, any of the machine direction stiffness and the transverse direction stiffness may satisfy the above range, but at least the machine direction stiffness preferably satisfies the above range, and both the machine direction stiffness and the transverse direction stiffness more preferably satisfies the above range.

The spunbond nonwoven fabric for use in filters of the present invention preferably has a machine direction stiffness of 10 mN or more and 100 mN or less. The spunbond nonwoven fabric for use in filters has a machine direction stiffness of more preferably 10 mM or more, and still more preferably 12 mN or more. The above range makes it possible to maintain a pleat retention property, which is preferable. If the machine direction stiffness is 100 mN or less, preferably 80 mN or less, and more preferably 60 mN or less, the folding endurance during pleating is not increased, and the finishing states of unevenness in a pleated configuration can be sharpened, which is preferable.

The spunbond nonwoven fabric for use in filters according to embodiments of the present invention has a ratio of a machine direction stiffness to a transverse direction stiffness of 3 or more. The pleat shape retention property is dominated by rigidity in a machine direction which is a folding direction, and rigidity in a transverse direction is not particularly limited, but it is 2 mN or more, and preferably 3 mN or more. The ratio of the machine direction stiffness to the transverse direction stiffness is preferably 3.0 or more, and particularly preferably 3.5 or more.

The spunbond nonwoven fabric for use in filters according to embodiments in the present invention has a weight per unit area of 150 g/m² or more and 300 g/m² or less. When the weight per unit area is 150 g/m² or more, the rigidity required for the pleat can be obtained, which is preferable. Meanwhile, when the weight per unit area is 300 g/m² or less, preferably 270 g/m² or less, and more preferably 260 g/m² or less, an increase in the pressure drop can be suppressed, and the cost can be reduced, which is preferable.

The weight per unit area here can be obtained by collecting three samples each having a size of 50 cm×50 cm, measuring the mass of each sample, converting the average value of the obtained values to a value per unit area, and then rounding the resulting value to the nearest integer.

The spunbond nonwoven fabric for use in filters according to embodiments of the present invention has a weight per unit area-CV value of 5% or less.

In the present invention, as the weight per unit area-CV value of the spunbond nonwoven fabric for use in filters, a value obtained by the following measurement is employed.

(i) 20 small pieces having a size of 5 cm×5 cm, 400 small pieces in total are collected in the machine direction and the transverse direction from the spunbond nonwoven fabric for use in filters.

(ii) The mass of each sample (nonwoven fabric) is measured.

(iii) The arithmetic average value (g) of the obtained values is converted to a value per unit area (1 m²), and the converted value is rounded to the nearest integer to obtain the weight per unit area of the spunbond nonwoven fabric for use in filters.

(iv) Based on the results of (i) to (iii), the CV value is calculated according to the following formula, and rounded to one decimal place.

weight per unit area-CV (%)=(standard deviation of weight per unit area)/(average value of weight per unit area)×100

The spunbond nonwoven fabric for use in filters of the present invention preferably has a weight per unit area-CV value of 5.0% or less. The weight per unit area-CV value is more preferably 4.5 or less, and still more preferably 4.0 or less. Since such a range makes it possible to provide the denser nonwoven fabric as the uniformity of the nonwoven fabric is improved, the collection efficiency is likely to be improved, whereby a satisfactory filter life is likely to be obtained, which is preferable. Meanwhile, it is more preferable that the weight per unit area-CV value is 1.0% or more in order to secure a certain amount of air permeability of the spunbond nonwoven fabric for use in filters to reduce the pressure drop, thereby extending the life of the filter.

When the folding endurance of the spunbond nonwoven fabric for use in filters of the present invention is expressed as folding endurance as measured according to JIS P8115: 2001 "Paper and board-Determination of folding endurance-MIT method", the folding endurance is 100,000 times or more, preferably 150,000 times or more, and more preferably 200,000 times or more. If the above folding endurance is within the above range, the folding endurance in pleated peak and valley portions is sufficient when a pulse jet method used while dust collected on the surface of the filter substrate is intermittently blown off by backflow air in a filter application for a dust collector is employed, whereby a satisfactory filter life can be obtained.

In the present invention, as the folding strength endurance of the spunbond nonwoven fabric for use in filters as measured according to JIS P8115:2001 "Paper and board-Determination of folding endurance-MIT method", a value obtained by measurement according to the following method is employed.

(i) From a sheet having a width of 50 cm, test pieces each having a width of 15 mm and a length of 110 mm are collected from three points positioned at equal intervals in the longitudinal direction of the spunbond nonwoven fabric for use in filters (direction perpendicular to the streaks of the pleated peaks and valleys).

(ii) The number of reciprocating folds is recorded until the sheet is cut at a tension of 2 kgf, a speed of 175 times/min, and an angle of ±135°.

(iii) The arithmetic average value of the three test pieces is obtained, and rounded to the nearest integer to determine the folding endurance (times) of the spunbond nonwoven fabric for use in filters.

The spunbond nonwoven fabric for use in filters in the present invention has a thickness of preferably 0.50 mm or more and 0.80 mm or less, and more preferably 0.51 mm or more and 0.78 mm or less. By setting the thickness to 0.50 mm or more, the rigidity can be improved, and the nonwoven fabric can be suitable for use as a filter. By setting the thickness to 0.80 mm or less, the spunbond nonwoven fabric for use in filters can have excellent handling performance and processability as a filter.

In the present invention, as the thickness (mm) of the spunbond nonwoven fabric for use in filters, a value obtained by measurement according to the following method is employed.

(i) Using a thickness gauge (for example, manufactured by TECLOCK Corporation; "TECLOCK" (registered trademark) SM-114 and the like), the thickness of the nonwoven fabric is measured at 10 points positioned at equal intervals along the width direction.

(ii) The above arithmetic average value is rounded to two decimal place to determine the thickness (mm) of the nonwoven fabric.

The spunbond nonwoven fabric for use in filters in the present invention preferably has an apparent density of 0.25 g/cm$^3$ or more and 0.40 g/cm$^3$ or less. When the apparent density is 0.25 or more and 0.40 g/cm$^3$ or less, the spunbond nonwoven fabric has a dense structure so that dust is less likely to enter the inside, and excellent dust brush-off performance. The apparent density is more preferably 0.26 g/cm$^3$ or more and 0.38 g/cm$^3$ or less.

In the present invention, as the apparent density (g/cm$^3$) of the spunbond nonwoven fabric for use in filters, a value obtained according to the following formula from the weight per unit area and thickness of the spunbond nonwoven fabric for use in filters is employed.

Apparent density (g/cm$^3$)=weight per unit area (g/m$^2$)/thickness (mm)/1000

The air permeability per weight per unit area of the spunbond nonwoven fabric for use in filters in the present invention is preferably 0.04 ((cm$^3$/(cm$^2$·sec))/(g/m$^2$)) or more and 0.50 ((cm$^3$/(cm$^2$·sec))/(g/m$^2$)) or less. When the air permeability per weight per unit area is 0.04 ((cm$^3$/(cm$^2$·sec))/(g/m$^2$)) or more, and preferably 0.05 ((cm$^3$/(cm$^2$·sec))/(g/m$^2$)) or more, the increase in the pressure drop can be suppressed. When the air permeability per weight per unit area is 0.50 ((cm$^3$/(cm$^2$·sec))/(g/m$^2$)) or less, and preferably 0.48 ((cm$^3$/(cm$^2$·sec))/(g/m$^2$)) or less, dust is less likely to accumulate in the inside, so that the dust brush-off performance is good.

In the present invention, as air permeability per weight per unit area ((cm$^3$/(cm$^2$·sec))/(g/m$^2$)) of the spunbond nonwoven fabric for use in filters, a value obtained by dividing a value measured based on 6.8.1 "Frazier Method" in 6.8 "Air permeability (JIS method)" in JIS L 1913:2010 "Test methods for nonwovens" by the above weight per unit area is employed as described below.

(i) Test pieces each having a size of 150 mm×150 mm are collected from ten points positioned at equal intervals in the width direction of the spunbond nonwoven fabric for use in filters.

(ii) The test piece is attached to one end of the cylinder of the tester, and a suction fan and air holes are then adjusted so that an inclined manometer reads a pressure of 125 Pa with a lower limit resistor. The pressure read by a vertical manometer at that time is measured.

(iii) From the measured pressure and the type of air holes used, the amount (cm$^3$/(cm$^2$·sec)) of air passing through the test piece is obtained from the conversion table attached to the tester.

(iv) The arithmetic average value of the obtained air permeabilities of the 10 test pieces is rounded to the nearest integer to calculate the air permeability (cm$^3$/(cm$^2$·sec)) of the spunbond nonwoven fabric for use in filters.

(v) The air permeability per weight per unit area is calculated by the following formula, and rounded to third decimal place to calculate the air permeability ((cm$^3$/(cm$^2$·sec))/(g/m$^2$)) per weight per unit area of the spunbond nonwoven fabric for use in filters.

Air permeability per weight per unit area ((cm$^3$/cm$^2$·sec)/(g/m$^2$))=Air permeability (cm$^3$/cm$^2$·sec)/weight per unit area (g/m$^2$)

The tensile strength in the machine direction per weight per unit area of the spunbond nonwoven fabric for use in filters according to embodiments of the present invention (hereinafter, may be referred to as machine direction tensile strength per weight per unit area) is 3.8 (N/5 cm)/(g/m$^2$) or more, and more preferably 4.0 (N/5 cm)/(g/m$^2$) or more. The tensile strength in the transverse direction per weight per unit area (hereinafter, may be referred to as transverse direction tensile strength per weight per unit area) is preferably 2.0 (N/5 cm)/(g/m$^2$) or more, and more preferably 2.3 (N/5 cm)/(g/m$^2$) or more.

By setting the machine direction tensile strength and the transverse direction tensile strength as described above, mechanical strength sufficient for practical application of the filter can be imparted so that the filter can have excellent durability. Here, the tensile strength per weight per unit area is calculated according to the following formula.

Tensile strength per weight per unit area ((N/5 cm)/(g/m$^2$))=Tensile strength (N/5 cm)/weight per unit area (g/m$^2$)

Here, in the present invention, the machine direction refers to a sheet conveying direction during the manufacture of the spunbond nonwoven fabric for use in filters, that is, the winding direction of the roll of the nonwoven fabric. The transverse direction refers to a direction perpendicular to the sheet conveying direction during the manufacture of the spunbond nonwoven fabric for use in filters, that is, the width direction of the roll of the nonwoven fabric.

In the present invention, as the tensile strength of the spunbond nonwoven fabric for use in filters, a value obtained by dividing a value measured based on 6.3.1 "Standard Time" in 6.3 "Tensile Strength and elongation (ISO method)" in JIS L1913:2010 "Test methods for nonwovens" by the weight per unit area is employed as described below.

(i) Test pieces each having a size of 30 cm×5 cm whose long side corresponded to the machine direction are collected from three points per 1 m positioned at equal intervals along the width direction.

(ii) Test pieces each having a size of 5 cm×30 cm whose long side corresponded to the transverse direction are collected from three points per 1 m positioned at equal intervals along the width direction.

(iii) Tensile tests are carried out at a grip distance of 20 cm and a tensile rate of 10 cm/min using a constant speed elongation type tensile tester.

(iv) The strength at break was read, and rounded to the nearest integer to determine the tensile strength (N/5 cm).

(v) The tensile strength (N/5 cm) value obtained in the above (iv) is divided by the value of the weight per unit area (g/m$^2$), and the resulting value is rounded to one decimal place to calculate the tensile strength per weight per unit area for each of the machine direction and the transverse direction.

EXAMPLES

Next, a spunbond nonwoven fabric for use in filters of the present invention and a manufacturing method thereof will be specifically described based on Examples.

(Measuring Method)

Property values in Examples described below were measured by the following methods. However, unless otherwise described, physical properties are measured based on the above methods.

(1) Melting Point of Polyester (° C.)

A differential scanning calorimeter "DSC-2 type" manufactured by Perkin-Elmer Corp. was used.

(2) Intrinsic Viscosity (IV) of Polyester

The intrinsic viscosity (IV) of the polyester was measured by the following method.

In 100 mL of ortho-chlorophenol, 8 g of a sample was dissolved, and its relative viscosity $\eta_r$ was determined according to the following formula using an Ostwald viscometer at a temperature of 25° C.

$$\eta_r = \eta/\eta_0 = (t \times d)/(t_0 \times d_0)$$

(Here, n represents the viscosity of a polymer solution; no represents the viscosity of ortho-chlorophenol; t represents the dropping time (seconds) of the solution; d represents the density of the solution (g/cm³); to represents the dropping time (seconds) of ortho-chlorophenol; and do represents the density of ortho-chlorophenol (g/cm³).) Next, the intrinsic viscosity (IV) was calculated from the relative viscosity $\eta_r$ according to the following formula. Intrinsic viscosity (IV) $=0.0242\eta_r + 0.2634$ (3) Thickness of Spunbond Nonwoven Fabric for Use in Filters (mm)

As a thickness gauge, "TECLOCK" (registered trademark) SM-114 manufactured by TECLOCK Corporation was used.

(4) Air Permeability of Spunbond Nonwoven Fabric for Use in Filters (cm³/(cm²·sec))

Air permeability was measured using an air permeability tester "FX3300-III" manufactured by TEXTEST AG.

(5) Stiffness (mN) of Spunbond Nonwoven Fabric for Use in Filters

A stiffness was measured using a Gurley type stiffness tester "GAS-10" manufactured by DAIEI KAGAKU SEIKI MFG. Co., Ltd.

(6) Tensile Strength of Spunbond Nonwoven Fabric for Use in Filters (N/5 cm)

As a constant speed elongation type tensile tester, Tensilon "RTC-1250A" manufactured by Toyo Baldwin Co., Ltd. was used.

(7) Folding Endurance of Spunbond Nonwoven Fabric for Use in Filters according to MIT Test (times)

An MIT folding strength fatigue tester "D type" manufactured by Toyo Seiki Seisaku-sho, Ltd. was used to measure the folding endurance of the spunbond nonwoven fabric for use in filters according to the MIT test.

(8) Compression Bonded Area Ratio of Spunbond Nonwoven Fabric for Use in Filters (%)

A digital microscope "VHX-5000" manufactured by Keyence Corporation was used to measure the compression bonded area ratio of the spunbond nonwoven fabric for use in filters. From arbitrary portions of the nonwoven fabric, three rectangular frames each having a size of 1.0 cm×1.0 cm parallel to the longitudinal direction and width direction of the nonwoven fabric were taken at a magnification of 20 times of the microscope. An area of a thermocompression bonding part in the rectangular frame to the area was measured at each of the three places, and the average value thereof was obtained. The average value was rounded to the nearest integer to determine the compression bonded area ratio.

(9) Dust collection performance Test of Spunbond Nonwoven Fabric for Use in Filters From arbitrary portions of the nonwoven fabric, three test samples each having a size of 15 cm×15 cm were collected, and a dust collection performance test was carried out using VDI/DIN 3926 as a reference standard. The filtration area of each test sample was set to 0.016 m², and the filtration air velocity was set to 2.0 m/min. As the dust powder, aluminum oxide particles (Dp50:10.5 μm) were used. The particles were supplied at a constant concentration such that the dust concentration in the upstream of the test sample was 5 g/m³.

First, an aging cycle in which 0.5-MPa compressed air was injected from a pulse-jet device for 1 second was carried out 5000 times at 5-second intervals. Subsequently, for post-aging evaluation of the performance, a brush-off cycle in which 0.5-MPa compressed air was injected for 1 second after the pressure drop reached 1000 Pa (when the pressure drop reached 1000 Pa in less than 5 seconds after the previous brush-off, the dust was loaded until 5 seconds after the previous brush-off, and the compressed air was then injected) was repeated 30 times. From the powder leakage concentration during the test, the dust collection rate was calculated according to the formula. The measurement was carried out in three replicates, and the average was rounded to three decimal place.

Dust collection rate (%)=(1-powder leakage concentration (g/m³)/upstream dust concentration (g/m³))×100.

The pressure drop was measured 5 seconds after the injection of pulse-jet in the 30th brush-off cycle. The measurement was carried out in three replicates, and the average was rounded to the nearest integer. The obtained value was taken as the pressure drop of the spunbond nonwoven fabric for use in filters.

A time required for the 30 brush-off cycles was taken as a circulation time (seconds).

(Resin Used)

Next, the details of resins used in Examples and Comparative Examples will be described.

Polyester resin A: Polyethylene terephthalate (PET) dried to a moisture content of 50 mass ppm or less, and having an intrinsic viscosity (IV) of 0.65 and a melting point of 260° C.

Polyester resin B: Copolymerized polyester (CO-PET) dried to a moisture content of 50% by mass or less, and having an intrinsic viscosity (IV) of 0.64, an isophthalic acid copolymerization rate of 11 mol %, and a melting point of 230° C.

EXAMPLE 1

The polyester resin A and the polyester resin B were respectively melted at temperatures of 295° C. and 280° C. Then, the polyester resin A as a core component and the polyester resin B as a sheath component were spun from the pore at a spinneret temperature of 295° C. and a core: sheath mass ratio of 80:20, and then filaments having a circular cross-sectional shape were spun at a spinning rate of 4900 m/min using an air sucker, followed by regulating alignment of fibers using a fiber spreading plate having a slit to deposit the fibers on a moving net conveyor, thereby collecting a fiber web composed of fibers having a single filament diameter of 14.8 μm. The collected fiber web was temporarily bonded by using a calendar roll composed of a pair of flat rolls at a temperature of 140° C. at a linear pressure of 50 kg/cm. Subsequently, the fiber web was thermobonded at a temperature of 200° C. and a linear pressure of 70 kg/cm by an embossing roll composed of a pair of engraved rolls having a compression bonded area ratio of 10% to obtain a spunbond nonwoven fabric for use in filters having a weight per unit area of 260 g/m². The spunbond nonwoven fabric for use in filters obtained had an apparent density of 0.35 g/cm³, air permeability of 13 cm³/(cm²·sec), air permeability per weight per unit area of 0.050 (cm³/(cm²·sec))/(g/m²), a machine direction stiffness of 45 mN, a transverse direction stiffness of 11 mN, a ratio of the machine direction stiffness to the transverse direction stiffness of 4.1, folding endurance according to the MIT test of 257936 times, and weight per unit area-CV of 2.8%. The results are shown in Table 1.

EXAMPLE 2

A spunbond nonwoven fabric for use in filters having a weight per unit area of 260 g/m² was obtained under the same conditions as in Example 1 except that a spinning rate was changed so that a single filament diameter was set to 14.4 μm and the speed of a net conveyor was changed so that a weight per unit area was set to the same as that of Example 1. The spunbond nonwoven fabric for use in filters obtained had an apparent density of 0.36 g/cm³, air permeability of 12 cm³/(cm²·sec), air permeability per weight per unit area of 0.046 (cm³/(cm²·sec))/(g/m²), a machine direction stiffness of 46 mN, a transverse direction stiffness of 13 mN, a ratio of the machine direction stiffness to the transverse direction stiffness of 3.5, folding endurance according to the MIT test of 362779 times, and weight per unit area-CV of 2.7%. The results are shown in Table 1.

EXAMPLE 3

A spunbond nonwoven fabric for use in filters which was composed of fibers having a single filament diameter of 14.8 μm and had weight per unit area of 200 g/m² was obtained under the same conditions as in Example 1 except that the speed of a net conveyor was adjusted to change the weight per unit area to 200 g/m². The spunbond nonwoven fabric for use in filters obtained had an apparent density of 0.32 g/cm³, air permeability of 22 cm³/(cm²·sec), air permeability per weight per unit area of 0.110 (cm³/(cm²·sec))/(g/m²), a machine direction stiffness of 26 mN, a transverse direction stiffness of 7 mN, a ratio of the machine direction stiffness to the transverse direction stiffness of 3.7, folding endurance according to the MIT test of 449155 times, and weight per unit area-CV of 3.0%. The results are shown in Table 1.

EXAMPLE 4

A spunbond nonwoven fabric for use in filters which was composed of fibers having a single filament diameter of 14.8 μm and had weight per unit area of 150 g/m² was obtained under the same conditions as in Example 1 except that the speed of a net conveyor was adjusted to change the weight per unit area to 150 g/m². The spunbond nonwoven fabric for use in filters obtained had an apparent density of 0.28 g/cm³, air permeability of 36 cm³/(cm²·sec), air permeability per weight per unit area of 0.240 (cm³/(cm²·sec))/(g/m²), a machine direction stiffness of 12 mN, a transverse direction stiffness of 3 mN, a ratio of the machine direction stiffness to the transverse direction stiffness of 4.0, folding endurance according to the MIT test of 427542 times, and weight per unit area-CV of 3.4%. The results are shown in Table 1.

The properties of the obtained nonwoven fabric were as shown in Table 1. All of the spunbond nonwoven fabrics for use in filters of Examples 1, 2, 3, and 4 had a machine direction stiffness of 10 mN or more, a ratio of the machine direction stiffness to a transverse direction stiffness of 3.5 or more, folding endurance of 250,000 times or more, and weight per unit area-CV of 3.5% or less, and had excellent rigidity, high folding endurance, and uniformity of a weight per unit area. The spunbond nonwoven fabric for use in filters exhibited good properties. The results of the dust collection performance test also showed that the spunbond nonwoven fabrics for use in filters had a dust collection rate of 99.9% or more, pressure drop of 500 Pa or less, and a circulation time of 1000 seconds or more, all of which were good. The results are shown in Table 1.

COMPARATIVE EXAMPLE 1

The polyester resin A and the polyester resin B were respectively melted at temperatures of 295° C. and 280° C. Then, the polyester resin A as a core component and the polyester resin B as a sheath component were spun from the pore at a spinneret temperature of 295° C. and a core: sheath mass ratio of 80:20, and then filaments were collided to a metal collision plate. Fibers were triboelectrically charged to spread the fibers, thereby collecting a fiber web. The collected fiber web was temporarily bonded by using a calender roll composed of a pair of flat rolls at a temperature of 140° C. at a linear pressure of 50 kg/cm. Subsequently, thermobonding was carried out at a temperature of 200° C. and a linear pressure of 60 kg/cm by an embossing roll composed of a pair of engraved rolls having a compression bonded area ratio of 18% to obtain a spunbond nonwoven fabric which was composed of fibers having a single filament diameter of 16.5 μm and had a weight per unit area of 260 g/m². The spunbond nonwoven fabric obtained had an apparent density of 0.42 g/cm³, air permeability of 11 cm³/(cm²·sec), air permeability per weight per unit area of 0.042 (cm³/(cm²·sec))/(g/m²), a machine direction stiffness of 25 mN, a transverse direction stiffness of 11 mN, a ratio of the machine direction stiffness to the transverse direction stiffness of 2.3, folding endurance according to the MIT test of 21139 times, and weight per unit area-CV of 6.0%. The results are shown in Table 1.

COMPARATIVE EXAMPLE 2

A spunbond nonwoven fabric which was composed of fibers having a single filament diameter of 16.5 μm and had a weight per unit area of 200 g/m² was obtained under the same conditions as in Comparative Example 1 except that the speed of a net conveyor was adjusted to change the weight per unit area to 200 g/m². The spunbond nonwoven fabric obtained had an apparent density of 0.37 g/cm³, air permeability of 18 cm³/(cm²·sec), air permeability per weight per unit area of 0.090 (cm³/(cm²·sec))/(g/m²), a machine direction stiffness of 15 mN, a transverse direction stiffness of 6 mN, a ratio of the machine direction stiffness to the transverse direction stiffness of 2.5, folding endurance according to the MIT test of 20591 times, and weight per unit area-CV of 6.2%. The results are shown in Table 1.

COMPARATIVE EXAMPLE 3

A spunbond nonwoven fabric which was composed of fibers having a single filament diameter of 16.5 μm and had a weight per unit area of 150 g/m² was obtained under the same conditions as in Comparative Example 1 except that the speed of a net conveyor was adjusted to change the weight per unit area to 150 g/m². The spunbond nonwoven fabric obtained had an apparent density of 0.35 g/cm³, air permeability of 30 cm³/(cm²·sec), air permeability per weight per unit area of 0.200 (cm³/(cm²·sec))/(g/m²), a machine direction stiffness of 8 mN, a transverse direction stiffness of 3 mN, a ratio of the machine direction stiffness to the transverse direction stiffness of 2.7, folding endurance according to the MIT test of 18687 times, and weight per unit area-CV of 6.4%. The results are shown in Table 1.

EXAMPLE 5

A spunbond nonwoven fabric which was composed of fibers having a single filament diameter of 12.0 μm and had a weight per unit area of 260 g/m² was obtained under the same conditions as in Example 1 except that a discharge rate was adjusted to change the single filament diameter and the speed of a net conveyor was changed. The spunbond nonwoven fabric obtained had an apparent density of 0.37 g/cm³, air permeability of 7 cm³/(cm²·sec), air permeability per weight per unit area of 0.027 (cm³/(cm²·sec))/(g/m²), a machine direction stiffness of 47 mN, a transverse direction stiffness of 13 mN, a ratio of the machine direction stiffness to the transverse direction stiffness of 3.6, folding endurance according to the MIT test of 77011 times, and weight per unit area-CV of 2.2%. The results are shown in Table 1.

COMPARATIVE EXAMPLE 4

A spunbond nonwoven fabric which was composed of fibers including a surface layer part having a single filament diameter of 14.0 μm and a back layer part having a single filament diameter of 18.0 μm, and had a weight per unit area of 260 g/m² was obtained under the same conditions as in Comparative Example 1 except that a discharge rate was adjusted to change the single filament diameter; a fiber web having a single filament diameter of 14.0 μm was collected on a net conveyor, and a fiber web having a single filament diameter of 18.0 μm was then laminated thereon to collect the fiber web; the speed of the net conveyor was changed; and an embossing roll having a compression bonded area ratio of 10% was used. The spunbond nonwoven fabric obtained had an apparent density of 0.33 g/cm³, air permeability of 15 cm³/(cm²·sec), air permeability per weight per unit area of 0.058 (cm³/(cm²·sec))/(g/m²), a machine direction stiffness of 28 mN, a transverse direction stiffness of 11 mN, a ratio of the machine direction stiffness to the transverse direction stiffness of 2.5, folding endurance according to the MIT test of 189081 times, and weight per unit area-CV of 6.6%. The results are shown in Table 1.

COMPARATIVE EXAMPLE 5

A spunbond nonwoven fabric which was composed of fibers having a single filament diameter of 16.5 μm and had a weight per unit area of 150 g/m² was obtained under the same conditions as in Comparative Example 3 except that an embossing roll having a compression bonded area ratio of 10% was used. The spunbond nonwoven fabric obtained had an apparent density of 0.29 g/cm³, air permeability of 40 cm³/(cm²·sec), air permeability per weight per unit area of 0.267 (cm³/(cm²·sec))/(g/m²), a machine direction stiffness of 12 mN, a transverse direction stiffness of 5 mN, a ratio of the machine direction stiffness to the transverse direction stiffness of 2.4, folding endurance according to the MIT test of 193583 times, and weight per unit area-CV of 6.3%. The results are shown in Table 1.

TABLE 1

| | Example 1 | Example 2 | Example 3 | Example 4 | Comparative Example 1 | Comparative Example 2 | Comparative Example 3 | Example 5 | Comparative Example 4 | Comparative Example 5 |
|---|---|---|---|---|---|---|---|---|---|---|
| Single filament diameter (μm) | 14.8 | 14.4 | 14.8 | 14.8 | 16.5 | 16.5 | 16.5 | 12.0 | 14.0/18.0 | 16.5 |
| Weight per unit area (g/m²) | 260 | 260 | 200 | 150 | 260 | 200 | 150 | 260 | 260 | 150 |
| Apparent density (g/cm³) | 0.35 | 0.36 | 0.32 | 0.28 | 0.42 | 0.37 | 0.35 | 0.37 | 0.33 | 0.29 |
| Air permeability (cm³/(cm²·sec)) | 13 | 12 | 22 | 36 | 11 | 18 | 30 | 7 | 15 | 40 |
| Air permeability per weight per unit area ((cm³/(cm²·sec))/(g/m²)) | 0.050 | 0.046 | 0.110 | 0.240 | 0.042 | 0.090 | 0.200 | 0.027 | 0.058 | 0.267 |
| Tensile strength, machine direction (N/5 cm) | 1167 | 1140 | 877 | 614 | 1213 | 893 | 703 | 1383 | 1091 | 438 |
| Compression bonded area ratio (%) | 10 | 10 | 10 | 10 | 18 | 18 | 18 | 10 | 10 | 10 |
| Stiffness (mN) Machine direction | 45 | 46 | 26 | 12 | 25 | 15 | 8 | 47 | 28 | 12 |
| Transverse direction | 11 | 13 | 7 | 3 | 11 | 6 | 3 | 13 | 11 | 5 |
| Ratio of machine direction stiffness to transverse direction stiffness (—) | 4.1 | 3.5 | 3.7 | 4.0 | 2.3 | 2.5 | 2.7 | 3.6 | 2.5 | 2.4 |
| Folding endurance according to MIT test (Times) | 257936 | 362779 | 449155 | 427542 | 21139 | 20591 | 18687 | 77011 | 189081 | 193583 |
| Weight per unit area-CV (%) | 2.8 | 2.7 | 3.0 | 3.4 | 6.0 | 6.2 | 6.4 | 2.2 | 6.6 | 6.3 |

TABLE 1-continued

|  | Example 1 | Example 2 | Example 3 | Example 4 | Comparative Example 1 | Comparative Example 2 | Comparative Example 3 | Example 5 | Comparative Example 4 | Comparative Example 5 |
|---|---|---|---|---|---|---|---|---|---|---|
| Circulation time (Seconds) | 1374 | 1435 | 1613 | 1958 | 152 | 162 | 187 | 290 | 153 | 192 |
| Dust collection rate (%) | 99.975 | 99.969 | 99.962 | 99.924 | 98.551 | 99.603 | 94.660 | 99.891 | 99.050 | 96.685 |
| Pressure drop (Pa) | 490 | 496 | 387 | 455 | 2200 | 1525 | 1480 | 624 | 1550 | 1430 |

The properties of the obtained nonwoven fabrics were as shown in Table 1. Although the nonwoven fabrics of Comparative Examples 1, 2 and 3 had the same air permeability as that of Examples 1, 3 and 4, the nonwoven fabrics had a high density, so that the nonwoven fabrics were apt to be clogged with dust, and had high pressure drop. Therefore, the nonwoven fabrics had poor dust collection performance, stiffness, folding endurance, and uniformity of a weight per unit area. The nonwoven fabric of Example 5 had a single filament diameter reduced under the same conditions as in Example 1. The nonwoven fabric had excellent uniformity of a weight per unit area. However, the nonwoven fabric had low air permeability, had ease of dust clogging, pressure drop, and dust collection performance poorer than those of Examples 1 to 4 although the nonwoven fabric was more excellent than the nonwoven fabrics of Comparative Examples 1 to 5, had folding endurance poorer than that of Examples 1 to 4. The nonwoven fabric of Comparative Example 4 had a compression bonded area ratio set to 10% in a different fineness configuration, but the nonwoven fabric had a poor weight per unit area-CV value, was apt to cause dust clogging, and had high pressure drop, so that the nonwoven fabric had poor dust collection performance, stiffness, and folding endurance. The nonwoven fabric of Comparative Example 5 having an increased single filament diameter had high air permeability, but the nonwoven fabric had a poor weight per unit area-CV value, so that the nonwoven fabric was apt to cause dust clogging to have high pressure drop, and poor dust collection performance.

INDUSTRIAL APPLICABILITY

The application of the spunbond nonwoven fabric for use in filters of the present invention is not limited at all, but the spunbond nonwoven fabric is preferably used as an industrial filter since it has excellent rigidity, folding endurance, uniformity of a weight per unit area, air permeability, and dust brush-off performance.

Particularly preferably, as a pleated configuration cylindrical unit, the spunbond nonwoven fabric is used for applications such as bag filters of a dust collector or the like and liquid filters of an electric discharge machine or the like, and further is used in an air intake filter which is used for cleaning the intake air of a gas turbine or an automobile's engine or the like. The spunbond nonwoven fabric can be suitably used as a pleated filter.

Furthermore, by taking advantage of the excellent rigidity and air permeability, it can also be suitably used as a pleated filter substrate to be laminated with a filter material such as a PTFE film or a nanofiber.

The invention claimed is:

1. A spunbond nonwoven fabric for use in filters, comprising a thermoplastic continuous filament and having a partially fused portion, wherein the nonwoven fabric has a stiffness of 2 mN or more and 100 mN or less, a weight per unit area-CV value of 1% or more and 5% or less, and a weight per unit area of 150 g/m² or more and 300 g/m² or less;
   wherein the thermoplastic continuous filament is a composite type filament in a form of core-sheath, in which a polyester low melting point polymer having a melting point lower than that of a polyester high melting point polymer by 10° C. or higher and 140° C. or lower is arranged as a sheath around the polyester high melting point polymer as a core;
   wherein the polyester high melting point polymer/polyester low melting point polymer include combinations of PET/PBT, PET/PTT, PET/polylactic acid, or PET/copolymerized PET; and
   wherein the spunbound nonwoven fabric has folding endurance of 100,000 times or more, as measured according to JIS P8115:2001 "Paper and board—Determination of folding endurance—MIT method".

2. The spunbond nonwoven fabric for use in filters according to claim 1, wherein the spunbond nonwoven fabric is fused by partial thermocompression bonding, and has a compression bonded area ratio of 5% or more and 15% or less.

3. The spunbond nonwoven fabric for use in filters according to claim 1, wherein the spunbond nonwoven fabric has a machine direction stiffness of 10 mN or more and 100 mN or less, and a ratio of the machine direction stiffness to a transverse direction stiffness, of 3 or more.

4. The spunbond nonwoven fabric for use in filters according to claim 1, wherein the spunbond nonwoven fabric has folding endurance of 150,000 times or more.

5. The spunbond nonwoven fabric for use in filters according to claim 1, wherein the spunbond nonwoven fabric has a weight per unit area-CV value of 4.5% or less.

6. The spunbond nonwoven fabric for use in filters according to claim 1, wherein the thermoplastic continuous filament has a single filament diameter of 10.0 μm or more and 22.0 μm or less.

7. The spunbond nonwoven fabric for use in filters according to claim 1, wherein the spunbond nonwoven fabric is processed into a pleated configuration.

8. The spunbond nonwoven fabric for use in filters according to claim 1, wherein the weight per unit area-CV value is obtained as follows:
   (i) 400 small pieces in total of the spunbond nonwoven fabric are collected from 20 small pieces having a size of 5 cm×5 cm, in each of the machine direction and the transverse direction,
   (ii) a mass of each of the 400 small pieces is measured and an arithmetic average value (g) of the obtained,
   (iii) the arithmetic average value (g) is converted to a value per unit area (1 m²), and the converted value is rounded to the nearest integer to obtain the weight per unit area of the spunbond nonwoven fabric for use in filters, and (iv) the weight per unit area-CV value is then calculated according to the following formula, and rounded to one decimal place, weight per unit area-CV (%)= (standard deviation of weight per unit area)/(average value of weight per unit area)×100.

9. A filter comprising the spunbonded nonwoven fabric according to claim 1, wherein the filter had a dust collection rate of 99.9% or more.

10. The filter according to claim 9, wherein the filter had a pressure drop of 500 Pa or less and 100 Pa or more.

11. The filter according to claim 9, wherein the filter had a circulation time of 1000 seconds or more.

12. The spunbond nonwoven fabric for use in filters according to claim 1, wherein the polyester high melting point polymer has a melting point of 200° C. or higher and 320° C. or lower and the polyester low melting point polymer has a melting point of 160° C. or higher and 250° C. or lower.

13. The spunbond nonwoven fabric for use in filters according to claim 1, wherein the polyester high melting point polymer/polyester low melting point polymer include PET/isophthalic acid-copolymerized PET.

14. The spunbond nonwoven fabric for use in filters according to claim 1, wherein the thermoplastic continuous filament has a single filament diameter in the range of 12.0 μm or more and 17.0 μm or less.

* * * * *